(12) United States Patent
Wussow

(10) Patent No.: US 6,484,861 B1
(45) Date of Patent: Nov. 26, 2002

(54) WRAP SPRING CLUTCH

(75) Inventor: James M. Wussow, El Paso, TX (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/634,934

(22) Filed: Aug. 8, 2000

(51) Int. Cl.⁷ ............................................ F16D 27/105
(52) U.S. Cl. ................... 192/84.81; 192/81 C
(58) Field of Search ............... 192/41 S, 84.81, 192/81 C

(56) References Cited

U.S. PATENT DOCUMENTS

| | | | |
|---|---|---|---|
| 495,602 A | 4/1893 | Shaw | |
| 1,674,009 A | 6/1928 | Holmes | |
| 2,046,439 A | 7/1936 | Wemp | 192/48 |
| 2,257,987 A | * 10/1941 | Starkey | 192/74 |
| 2,298,970 A | 10/1942 | Russell et al. | 192/33 |
| 2,551,739 A | * 5/1951 | Harlan | 192/41 R |
| 3,128,863 A | * 4/1964 | Tomko | 192/81 C |
| 4,258,556 A | 3/1981 | Ruyten et al. | 64/30 E |
| 4,263,995 A | 4/1981 | Wahlstedt | 192/35 |
| 4,330,054 A | 5/1982 | MacDonald | 192/35 |
| 5,058,720 A | 10/1991 | Rude et al. | 192/41 S |
| 6,138,808 A | * 10/2000 | Wussow | 192/84.81 |

FOREIGN PATENT DOCUMENTS

| | | | | |
|---|---|---|---|---|
| GB | 2 034 830 A | * 6/1980 | | 192/84.81 |
| JP | 57-190123 A | * 11/1982 | | 192/81 C |

* cited by examiner

Primary Examiner—Richard M. Lorence
(74) Attorney, Agent, or Firm—Dykema Gossett PLLC

(57) ABSTRACT

An electromagnetically actuated wrap spring clutch is provided. The inventive clutch includes a shaft hub disposed about a longitudinal axis and an input hub that is coaxial with the shaft hub. The input hub includes a first portion having a first diameter and a second portion having a second diameter wherein the second diameter is smaller than the first diameter and the second portion is nearer the shaft hub than the first portion. The clutch also includes a spring connected to the input hub and disposed radially outwardly of a portion of the shaft hub and the first and second portions of the input hub. The spring may be symmetrical, having a uniform diameter and including first and second tangs disposed at either end of the spring wherein both tangs extend radially outwardly. The clutch further includes a control collar connected to the spring and a coil disposed about shaft hub. The use of the multiple diameter input hub and symmetrical spring reduce assembly time, cost, and clutch engagement time.

17 Claims, 3 Drawing Sheets

WRAP SPRING CLUTCH

BACKGROUND OF THE INVENTION

1. Technical Field

This invention relates to a wrap spring clutch and more particularly to an electromagnetically actuated wrap spring clutch designed to reduce assembly time, cost, and clutch engagement time.

2. Discussion of the Background Art

A conventional, electromagnetically actuated, wrap spring clutch includes an output shaft, a shaft hub disposed about the shaft and connected for rotation therewith, and an input hub. The input hub is also disposed about the shaft, but may rotate independently of the shaft when the wrap spring clutch is de-energized. The clutch further includes a coil substantially disposed about the shaft hub and an annular wrap spring disposed about a portion of the input hub and a portion of the shaft hub. A first end of the wrap spring is connected to the input hub so that the spring rotates with the input hub. A second end of the wrap spring is disposed radially outwardly of the shaft hub and is free of the shaft hub when the clutch is de-energized. Energizing the coil establishes magnetic flux circuits or closed loops in the magnetically permeable portions of the clutch. Attractive forces arising from the flux draw a second end of the spring into contact with the shaft hub (which may be non-rotating at this point). Frictional forces restrain the second end of the spring from rotating. The difference in relative rotation between the first and second ends of the spring causes the spring to wrap down upon the shaft hub, thereby transmitting torque from the input hub to the shaft hub and output shaft.

The wrap spring used in a conventional spring clutch includes a first portion having a first diameter and a second portion having a second diameter different from the first diameter. The portion having the larger diameter is disposed about the shaft hub to allow clearance between the wrap spring and the shaft hub when the clutch is de-energized. The portion having the smaller diameter is disposed about the input hub and a plurality of turns of the wrap spring interfere with the input hub to secure the spring and minimize engagement time for the clutch. The use of a multi-diameter wrap spring, however, increases the manufacturing costs of the clutch and the interference between the spring and the input hub makes it difficult to assemble the wrap spring onto the input hub.

The wrap spring used in a conventional spring clutch also includes first and second tangs at either end of the spring. The first tang extends radially inwardly toward the center of the coil formed by the spring and secures the spring to the input hub. The second tang extends radially outwardly and is connected to a control collar disposed outwardly of the shaft hub. The use of radially inwardly and radially outwardly extending tangs, however, has several disadvantages. First, when assembling the wrap spring to the input hub, the wrap spring must be opened sufficiently to position the inward tang over the diameter of the input hub. This can result in damage to the wrap spring and/or damage to the input hub if the tang scratches the hub surface. Second, the spring must be properly oriented during assembly thereby increasing assembly time.

There is, therefore, a need for an electromagnetically actuated wrap spring clutch that minimizes or eliminates one or more of the above-mentioned problems.

SUMMARY OF THE INVENTION

The present invention provides an electromagnetically actuated wrap spring clutch.

An electromagnetically actuated wrap spring clutch in accordance with the present invention includes a shaft hub disposed about a longitudinal axis and an input hub that is coaxial with the shaft hub. The input hub includes a first portion having a first diameter and a second portion having a second diameter wherein the second diameter is smaller than the first diameter and the second portion is nearer the shaft hub than the first portion. The clutch also includes a spring disposed radially outwardly of a portion of the shaft hub and the first and second portions of the input hub and connected to the input hub. The spring may be symmetrical, having a uniform diameter and including first and second tangs disposed at either end of the spring wherein both tangs extend radially outwardly. The clutch further includes a control collar connected to the spring and disposed radially outwardly of the spring and a coil disposed about the shaft hub.

A wrap spring clutch in accordance with the present invention has several significant advantages over conventional wrap spring clutches. First, the inventive clutch minimizes clutch engagement time because, given the equal number of wraps, the spring is able to wrap down onto the shaft hub more quickly. Second, the inventive clutch requires less assembly time because: (i) the reduced diameter portion of the input hub allows the wrap spring to be more easily assembled onto the input hub; (ii) the symmetrical spring makes orientation of the spring irrelevant during assembly; and (iii) both tangs of the spring extending outwardly thereby eliminating the need to expand the spring prior to installation on the input hub. Third, the inventive clutch is less likely to be damaged during assembly because both tangs of the spring extend radially outwardly, thereby eliminating any contact between the tangs and the input hub surface. Finally, the inventive clutch costs less than conventional clutches due to the use of a less costly symmetrical spring and the reduction in assembly time.

These and other features and objects of this invention will become apparent to one skilled in the art from the following detailed description and the accompanying drawings illustrating features of this invention by way of example.

DETAILED DESCRIPTION OF THE PREFERRED EMBODIMENTS

Figure 1:
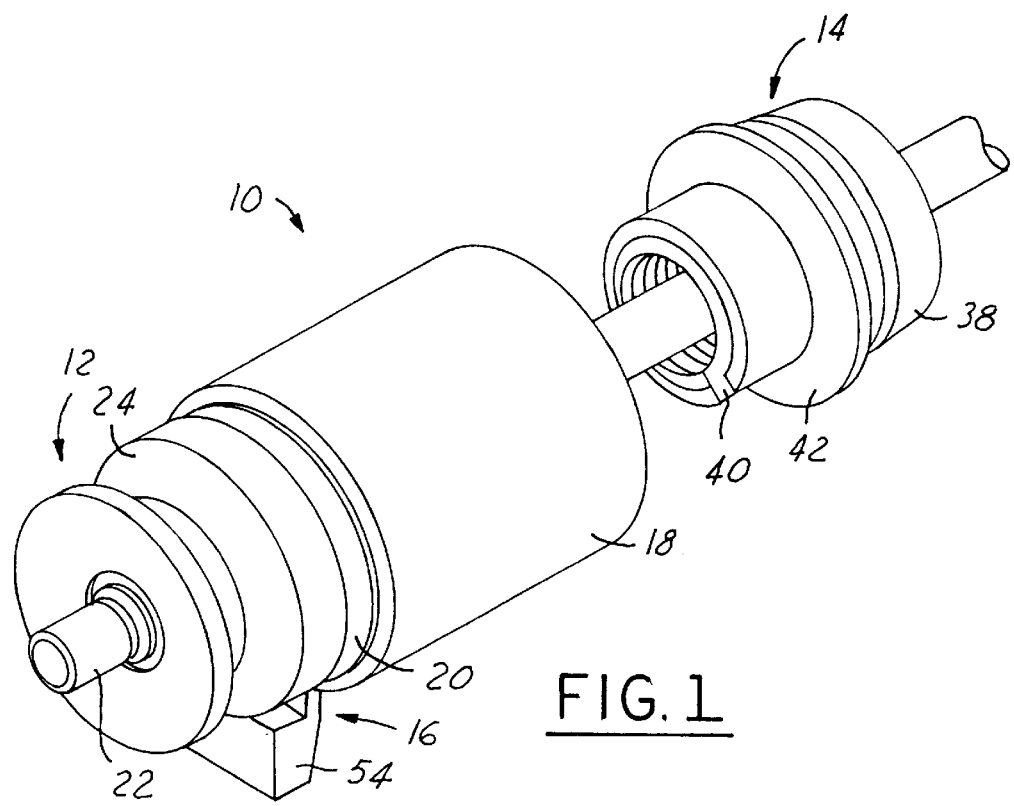
FIG. 1 is an partially exploded, perspective view of a wrap spring clutch in accordance with the present invention.
Figure 2:
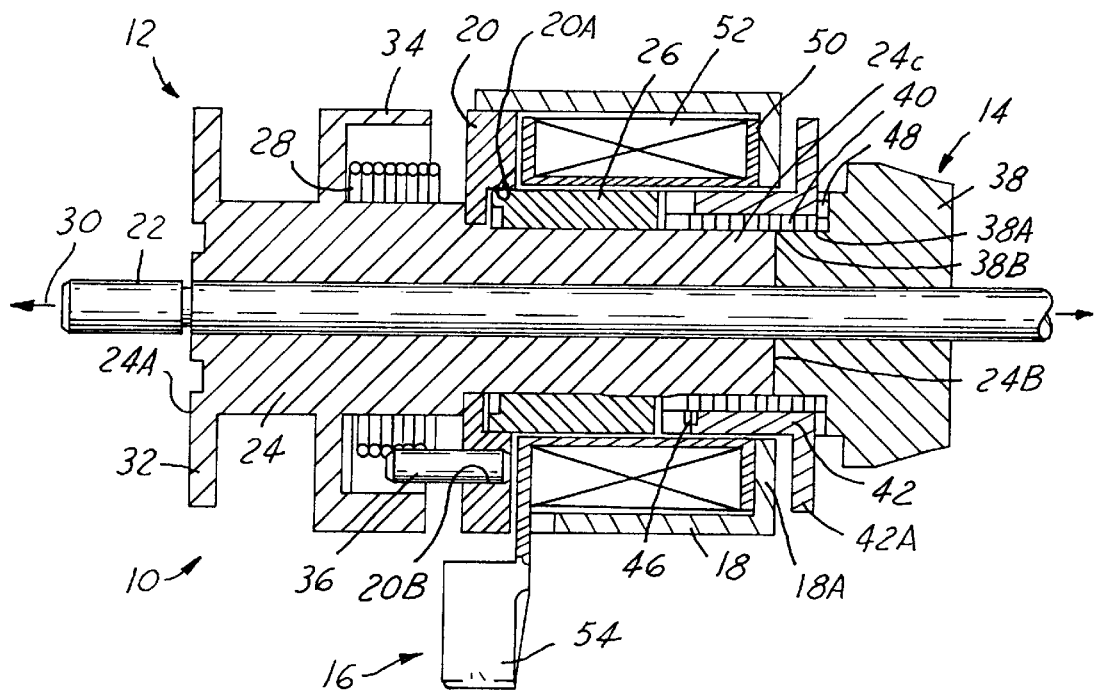
FIG. 2 is a sectional view of a wrap spring clutch in accordance with the present invention.

Referring now to the drawings wherein like reference numerals are used to identify identical components in the various views, FIGS. 1–2 illustrate a wrap spring clutch 10 in accordance with the present invention. Clutch 10 is provided for use in a vehicle speed control device. It should be understood, however, that clutch 10 may be used in a wide variety of applications. Clutch 10 includes an output assembly 12, an input hub assembly 14, a coil assembly 16, a housing 18, and an end plate 20.

Output assembly 12 is provided to selectively rotate an object affixed to an output shaft 22 extending from assembly 12. The object may, for example, comprise the spool for a coil used to control a throttle plate in a speed control device. Assembly 12 includes shaft assembly 24, sleeve 26, and return spring 28.

Shaft assembly 24 is provided to transmit torque from input hub assembly 14 to output shaft 22. Shaft assembly 24 is conventional in the art and can be made from plastic, or other non-magnetic materials. Referring to FIG. 2, shaft assembly 24 is annular and is centered about a longitudinal axis 30. Shaft assembly 24 is coupled to output shaft 22 for rotation therewith through, for example, a conventional key/keyway, pinning or press fit relationship. Shaft assembly 24 includes an end flange 32 extending radially outwardly from one longitudinal end 24A of shaft assembly 24 and a collar 34 intermediate the two longitudinal ends 24A, 24B of shaft assembly 24. Collar 34 is substantially L-shaped in cross-section and is configured to receive return spring 28. Assembly 24 also defines a shaft hub 24C at one end 24B that is coaxial with input hub 38.

Sleeve 26 forms part of the magnetic circuit for the transfer of magnetic flux within clutch 10 and is provided to attract control collar 42 so as to transfer torque to output assembly 12. Sleeve 26 may be made from a material having a relatively high magnetic permeability such as powdered iron or another ferromagnetic material. Sleeve 26 is annular and is centered about axis 30. Sleeve 26 is disposed about shaft assembly 24 and may be press fit onto shaft assembly 24. It should be understood, however, that although sleeve 26 is shown as a separate component of clutch 10, sleeve 26 may be made integral with shaft assembly 24 if assembly 24 is also made from a material having a relatively high magnetic permeability. In the illustrated embodiment, however, assembly 24 and sleeve 26 are separate components to enable use of less costly plastic in forming assembly 24.

Return spring 28 is provided to maintain the relative positions of output assembly 12 and end plate 20. Spring 28 is conventional in the art and may be made from conventional metals or other materials. Spring 28 is disposed about a portion of shaft assembly 24 and is received within collar 34 of shaft assembly 24. Spring 28 is coupled at one end to shaft assembly 24 and at a second end to a roll pin 36 that is received within end plate 20.

Input hub assembly 14 is provided to transmit torque to output assembly 12. Assembly 14 includes an input hub 38, a wrap spring 40, and a control collar 42.

Figure 4:
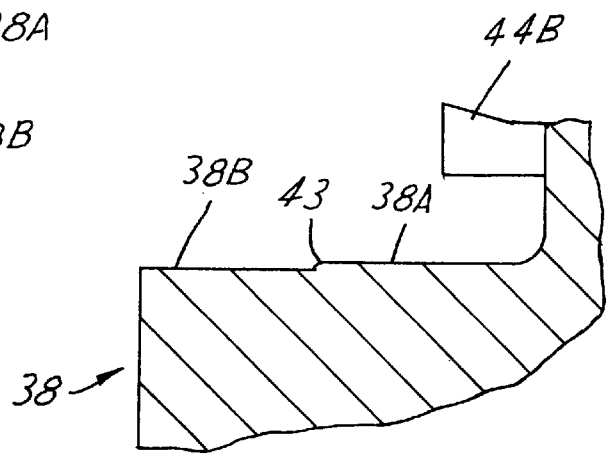
FIG. 4 is a enlarged sectional view of a portion of the input hub of the clutch of FIGS. 1–2.

Input hub 38 is provided to generate a torque within clutch 10. Hub 38 may be comprised of a nonferromagnetic material such as glass filled nylon. Input hub 38 is annular in construction and is centered about axis 30, coaxial with shaft hub 24C of assembly 24. Input hub 38 may be disposed about output shaft 22. Hub 38, however, is rotatable relative to shaft 22 and shaft assembly 24 when clutch 10 is de-energized. The outer periphery of input hub 38 may comprise a driven gear. Alternatively, input hub 38 may be driven directly by an input shaft (not shown). Referring now to FIG. 4, in accordance with the present invention hub 38 includes a first portion 38A having a first diameter and a second portion 38B having a second diameter, smaller than the first diameter. Portion 38B is disposed nearer to shaft hub 24C than portion 38A and the two portions 38A, 38B may form a shoulder 43. Referring again to FIG. 2, spring 40 is disposed radially outwardly of both portions 38A, 38B of input hub 38 of assembled clutch 10. The incorporation of an input hub 38 having a varying diameter in the region about which the wrap spring 40 is disposed represents a significant advantage compared to conventional wrap spring clutches. First, the input hub 38 enables the use of a single diameter wrap spring 40, thereby reducing the cost of the clutch 10. Second, the input hub 38 makes it easier to assemble the clutch 10 because there is less interference between the spring 40 and the input hub 38. Finally, full clutch engagement occurs more quickly because, given the equal number of wraps, the spring 40 is able to wrap down onto the shaft hub 24C more quickly. Although the illustrated hub 38 has a stepped change in diameter, it should be understood that the diameter of input hub 38 may be continuously decreasing (i.e., tapered) or be formed in other ways provided the diameter decreases in the direction approaching the shaft hub 24C.

Figure 3:
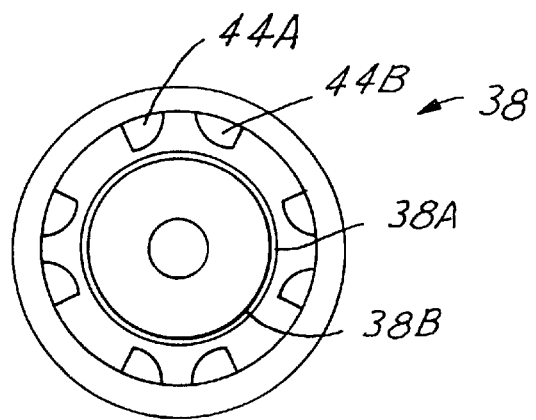
FIG. 3 is a plan view of the input hub of the clutch of FIGS. 1–2.

Referring now to FIGS. 3 and 4, input hub 38 also includes a plurality of posts 44A, 44B for a purpose described hereinbelow. Posts 44A, 44B are arranged in pairs about the circumference of input hub 38 radially outwardly of portion of hub 38 and the pairs are angularly spaced from one another. Each post 44A, 44B extends from input hub 38 in a direction generally parallel to axis 30. Posts 44A, 44B may be molded to input hub 38.

Figure 5:
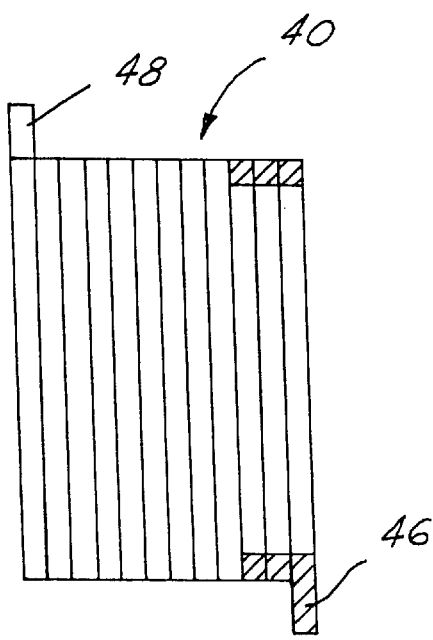
FIGS. 5–6 are plan views of the wrap spring of the clutch of FIGS. 1–2.
Figure 6:
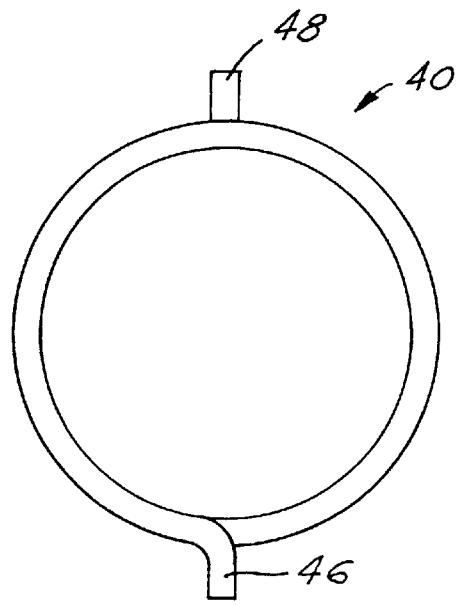

Spring 40 provides a secure engagement between input hub 38 and shaft hub 24C upon energization of clutch 10. Referring again to FIG. 2, spring 40 may be disposed radially outwardly of portion of shaft hub 24C and portions 38A, 38B of input hub 38. Referring to FIGS. 5-6, in accordance with the present invention spring 40 has a uniform diameter. Further, spring 40 is symmetrical and includes tangs 46, 48 at each end—both of which extend radially outwardly. Tang 46 is received within control collar 42. Tang 48 is received within posts 44A, 44B of input hub 38. The incorporation of spring 40 within clutch 10 also represents a significant advantage as compared to conventional wrap spring clutches. First, because spring 40 is symmetrical, orientation during assembly is not required thereby reducing assembly time. Second, because spring 40 has a uniform diameter, the manufacturing costs of spring 40—and therefore clutch 10—is reduced. Finally, because tangs 46, 48 both extend radially outwardly, placement of spring 40 onto input hub 38 does not require expansion of spring 40—thereby reducing assembly time—and lessens the risk of damage to both spring 40 and the surface of input hub 38.

Referring again to FIG. 2, control collar 42 is provided for selective attraction to, and frictional engagement with, sleeve 26 of output assembly 12. Collar 42 may be made from a ferromagnetic material such as powdered iron. Upon energization of clutch 10, magnetic flux threads across the gap between collar 42 and sleeve 26 and draws collar 42 into engagement with sleeve 26 thereby causing spring 40 to wrap down upon shaft hub 24C and rotatably couple input hub 38 and shaft assembly 24. Collar 42 is annular in construction and is disposed about axis 30 radially outwardly of portions of shaft assembly 24 and input hub 38. Collar 42 may be substantially L-shaped in cross-section.

Coil assembly 16 is provided to generate a magnetic field to create a magnetic circuit among several components of clutch 10. Assembly 16 includes a bobbin 50, a coil 52, and a magnetic terminal block 54.

Bobbin 50 is provided to support coil 52 and is conventional in the art. The inner diameter of bobbin 50 is sized to received sleeve 26 of output assembly 12 and control collar 42 of input assembly 14.

Coil 52 is provided to transport electrical current and is also conventional in the art. Coil 52 is supported on bobbin 50 and each end of coil 52 terminates at terminal block 54.

Terminal block 54 is provided to connect coil 52 to a power source (not shown) and is conventional in the art. Block 54 may be integral with bobbin 50. Block 54 may include a pair of metallic contacts disposed within a terminal housing that extends radially outwardly through an opening in housing 18.

Housing 18 is provided to house coil assembly 16 and to form a portion of the magnetic circuit for the transfer of magnetic flux within clutch 10. Housing 18 further protects some of the components of clutch 10 from foreign objects or elements. Housing 18 may made from a ferromagnetic material such as powdered iron. Housing 18 is annular in construction and is centered about axis 30. Housing 18 is disposed radially outwardly of coil assembly 16 and is generally L-shaped in construction. A radially inwardly extending flange 18A of housing 18 is axially adjacent a radially outwardly extending flange 42A of control collar 42 and serves to reduce the power required to fully engage clutch 10 as set forth in copending U.S. application Ser. No. 09/023,525 the entire of disclosure of which is incorporated herein by reference.

End plate 20 is provided to maintain the physical location and relationship of several of the components within clutch 10 and forms part of the magnetic circuit for the transfer of magnetic flux within clutch 10. End plate 20 may be made from a ferromagnetic material such as powdered iron. End plate is annular in construction and is centered about axis 30. Plate 20 is disposed radially inwardly of housing 18 at one end thereof and may be press fit into housing 18. End plate 20 has a recess 20A on a first side configured to receive sleeve 26 of output assembly 12 and has a bore 20B on a second side configured to receive one end of a roll pin 36. The other end of pin 36 is coupled to return spring 28 to ensure that clutch 10 is rotated as a unit upon energization of clutch 10.

Referring to FIG. 2, a method of assembling clutch 10 includes several steps. The method may first include the steps of forming and testing the coil assembly 16. The step of forming coil assembly 16 may include the substeps of winding coil 52 about bobbin 50 and connecting the ends of coil 52 to the terminals within terminal block 54. The method of assembling clutch 10 may then include the step of forming the housing assembly. This step may include the substeps of inserting coil assembly 16 within housing 18, pressing roll pin 36 into bore 20B of end plate 20, and pressing end plate 20 into one end of housing 18. The method of assembly may also include the step of forming the input assembly 14. This step may include the substeps of pressing tangs 46, 48 of spring 40 into control collar 42 and posts 44A, 44B of input hub 38. The method of assembly may also include the step of forming the output assembly 12. This step may include the substeps of: (i) inserting one end of shaft assembly 24 through end plate 20 and into housing 18; (ii) installing the return spring 28 within collar 34 of shaft assembly 24; (iii) inserting sleeve 26 through the end of housing 18 opposite the end containing end plate 20; and, (iv) pressing sleeve 26 onto is shaft assembly 24. Finally, the method of assembly may include the step of inserting output shaft 22 into clutch 10 and placing snap rings (not shown) or other means for maintaining the position of shaft 22 onto shaft 22.

Figure 7:
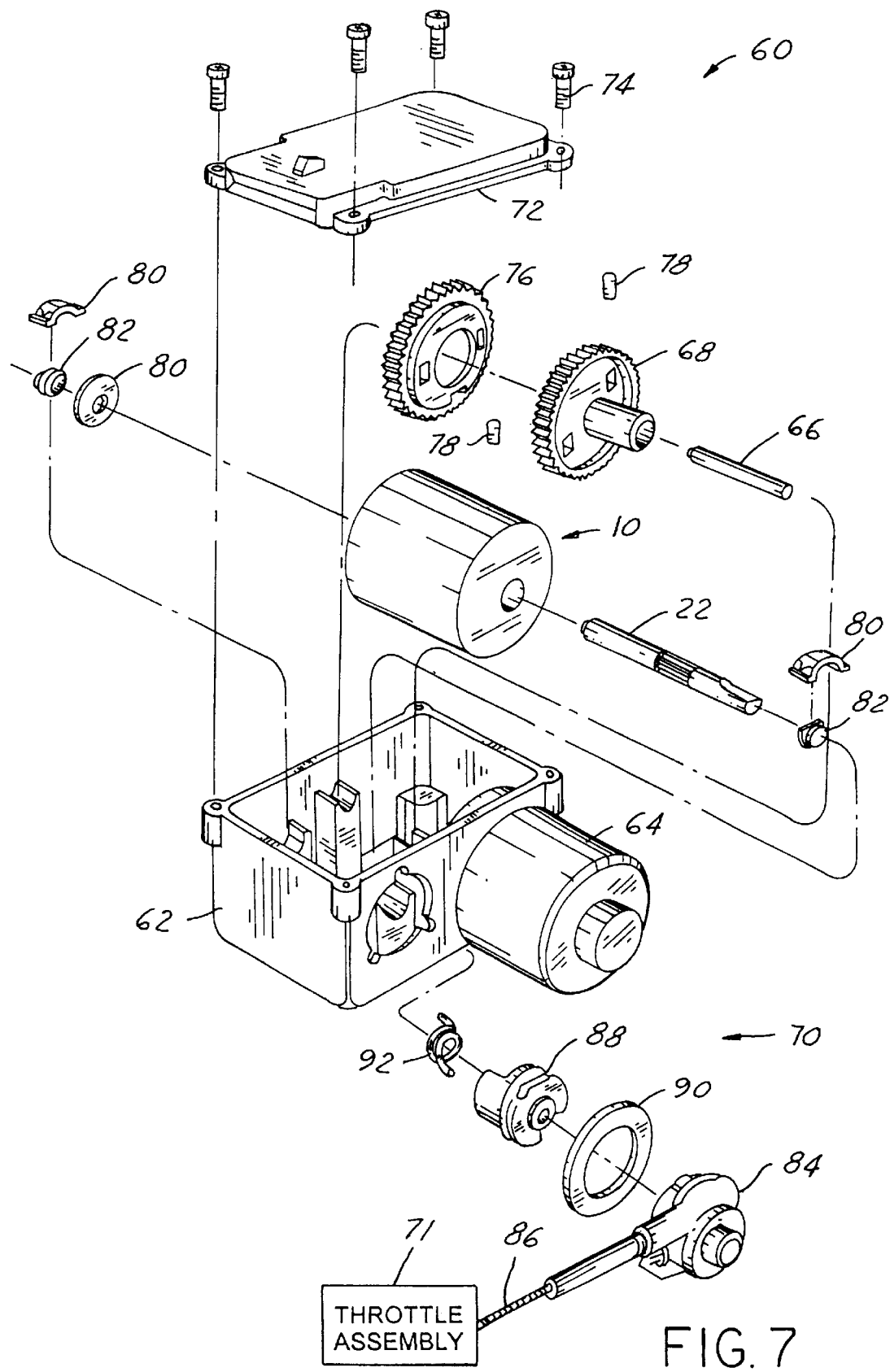
FIG. 7 is an exploded perspective view of a vehicle speed control device incorporating the wrap spring clutch of FIGS. 1–2.

Referring now to FIG. 7, a vehicle speed control device 60 is illustrated incorporating an electromagnetic spring clutch, such as clutch 10. Besides clutch 10, device includes a housing 62, means, such as motor 64, for rotating an input shaft 66, a transfer gear 68, and means, such as cable assembly 70, for controlling a throttle assembly 71 of the vehicle.

Housing 62 is provided to protect the internal components of device 60 from external elements. Housing 62 may be made from a plurality of conventional materials including various metals and plastics. Housing 62 includes a module 72 through which electrical connections may be made to clutch 10 and motor 64 and control signals provided to clutch 10 and motor 64. Module 72 may be secured to the rest of housing 62 by screws 74, bolts, or other fastening means.

Motor 64 is provided to cause input shaft 66 to rotate. Motor 64 is conventional in the art and may take on any of a plurality of forms well-known in the art. Input shaft 66 extends from motor 64 and is also conventional in the art.

Transfer gear 68 is provided to impart rotation to input hub 38 of clutch 10 responsive to rotation of input shaft 66. As mentioned hereinabove, the peripheral portion of input hub 38 may comprise a gear (not shown). The teeth of gear 68 mesh with the teeth of the gear (not shown) formed by input hub 38. Device 60 may also include an anti-backlash gear 76 connected to transfer gear 68 by anti-backlash springs 78. The teeth of gear 76 also mesh with the teeth of the gear formed by input hub 38. Gear 76 and springs 78 function in a conventional manner to reduce mechanical noise and increase response time in response to a change in rotational direction of the gear formed by input hub 38. Transfer gear 68, anti-backlash gear 76, and springs 78 are all conventional in the art.

Clutch 10 is utilized within device 60 to selectively couple input shaft 66 of device with output shaft 22 extending from clutch 10. As described in greater detail hereinabove with reference to FIG. 2, wrap spring 40—which is connected to input hub 38—is selectively, electromagnetically actuated through a power input, or control signal, to wrap down upon shaft hub 24C portion of shaft assembly 24 of clutch 10. Because shaft assembly 24 is connected to output shaft 22, the torque generated by input shaft 66 and transmitted to input hub 38 via transfer gear 68, is transmitted to output shaft 22. Clutch 10 may be positionally secured by a plurality of conventional retainers 80 and bearings 82.

Cable assembly 70 is provided to control throttle assembly 71 of the vehicle according to a rotation of output shaft 22. Assembly 70 includes a plurality of conventional components including cover assembly 84, cable 86, spool 88, seal 90, and return spring 92. Cover assembly 84 is provided to house cable 86 and spool 88. Cable 86 is provided to actuate throttle assembly 71 and is wound upon spool 88 which is connected to output shaft 22. Seal 90 is provided to prevent the loss of lubricants from cover assembly 84 and the introduction of foreign objects into cover assembly 84. Finally, return spring 92 is provided to bias spool 88, and therefore, cable 86 and the throttle assembly 71, to a predetermined position.

It is to be understood that the above description is merely exemplary rather than limiting in nature, the invention being limited only by the appended claims. Various modifications and changes may be made thereto by one of ordinary skill in the art which embody the principles of the invention and fall within the spirit and scope thereof.

I claim:

1. An electromagnetically actuated wrap spring clutch, comprising:
   a shaft hub disposed about a longitudinal axis;
   an input hub coaxial with said shaft hub, said input hub including a first portion having a first diameter and a second portion having a second diameter, said second diameter smaller than said first diameter and said second portion nearer said shaft hub than said first portion;
   a spring disposed radially outwardly of a portion of said shaft hub and said first and second portions of said input hub, said spring connected to said input hub;
   a control collar connected to said spring; and,
   a coil disposed about said shaft hub.

2. The spring clutch of claim 1 wherein said first and second portions define a shoulder therebetween.

3. The spring clutch of claim 1 wherein said input hub includes first and second posts configured to receive a tang of said spring.

4. The spring clutch of claim 3 wherein said first and second posts extend axially from said input hub.

5. The spring clutch of claim 1 wherein said spring is symmetric.

6. The spring clutch of claim 1 wherein a first end of said spring is connected to said input hub and a second end of said spring is connected to said control collar.

7. An electromagnetically actuated wrap spring clutch, comprising:
   a shaft hub disposed about a longitudinal axis;
   an input hub coaxial with said shaft hub, said input hub including a first portion having a first diameter and a second portion having a second diameter, said second diameter smaller than said first diameter and said second portion nearer said shaft hub than said first portion;
   a spring disposed radially outwardly of a portion of said shaft hub and said first and second portions of said input hub, said spring connected to said input hub;
   a control collar connected to said spring; and,
   a coil disposed about said shaft hub
      wherein said spring includes a first tang extending radially outwardly and received by said control collar and a second tang extending radially outwardly and received by said input hub.

8. The spring clutch of claim 7 wherein said first and second portions define a shoulder therebetween.

9. The spring clutch of claim 7 wherein said input hub includes first and second posts configured to receive said second tang of said spring.

10. The spring clutch of claim 9 wherein said first and second posts extend axially from said input hub.

11. The spring clutch of claim 7 wherein said spring is symmetric.

12. The spring clutch of claim 7 wherein a first end of said spring is connected to said input hub and a second end of said spring is connected to said control collar.

13. An electromagnetically actuated wrap spring clutch, comprising:
   a shaft hub disposed about a longitudinal axis;
   an input hub coaxial with said shaft hub, said input hub including a first portion having a first diameter and a second portion having a second diameter, said second diameter smaller than said first diameter and said second portion nearer said shaft hub than said first portion;
   a spring disposed radially outwardly of a portion of said shaft hub and said first and second portions of said input hub, said spring connected to said input hub;
   a control collar connected to said spring; and,
   a coil disposed about said shaft hub
      wherein said spring has a uniform diameter and includes a first tang extending radially outwardly and received by said control collar and a second tang extending radially outwardly and received by said input hub.

14. The spring clutch of claim 13 wherein said first and second portions define a shoulder therebetween.

15. The spring clutch of claim 13 wherein said input hub includes first and second posts configured to receive said second tang of said spring.

16. The spring clutch of claim 15 wherein said first and second posts extend axially from said input hub.

17. The spring clutch of claim 13 wherein said spring is symmetric.

* * * * *